July 18, 1972 J. GRAFF ET AL 3,677,706
REACTOR
Filed Feb. 24, 1970
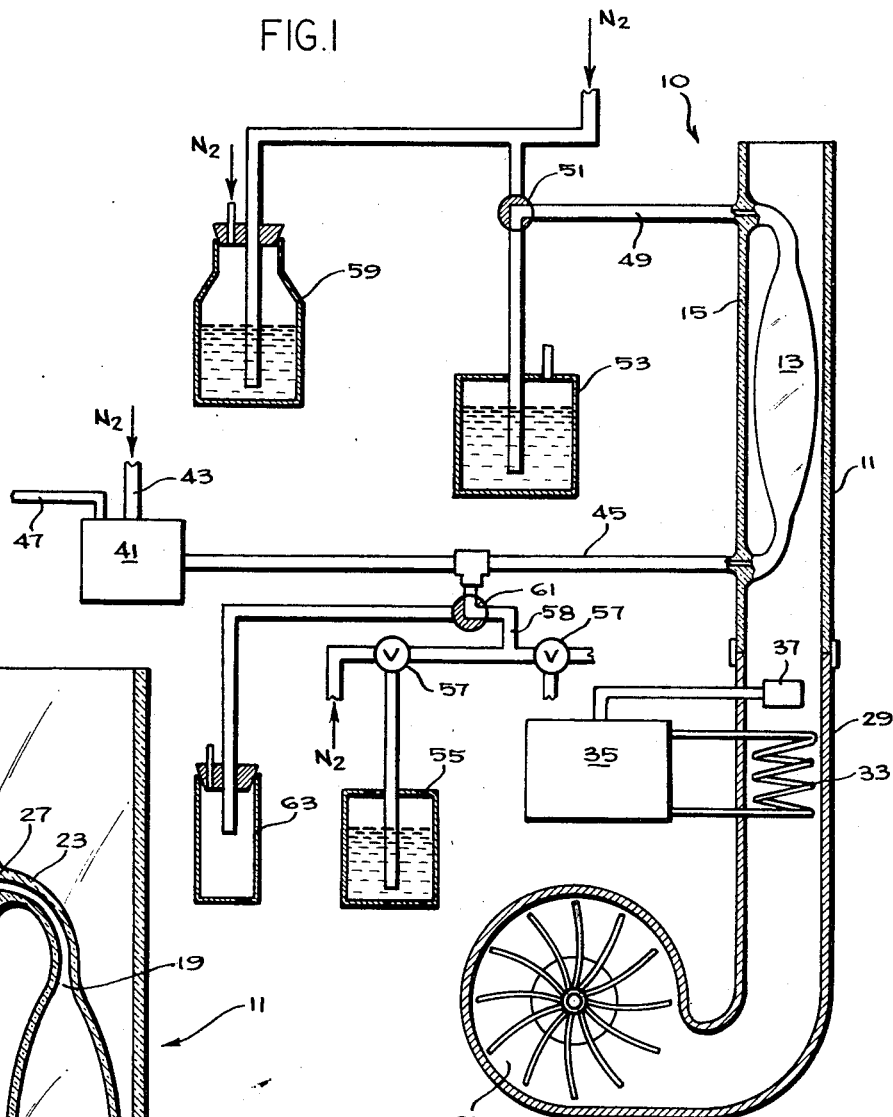
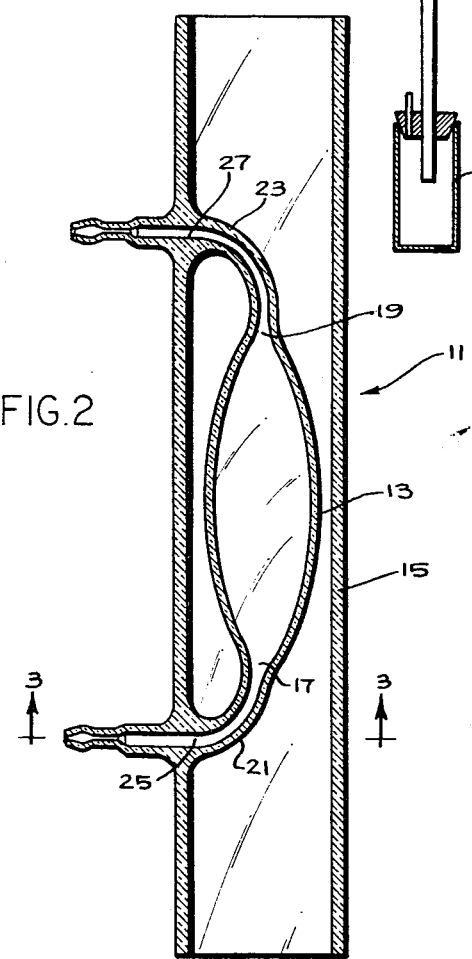
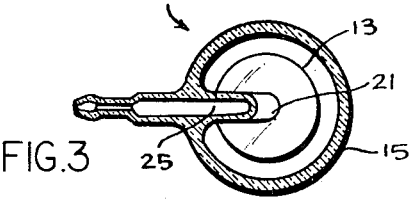
INVENTORS
JACK GRAFF
RALPH A. DORA
Anderson, Luedeka, Fitch, Even, & Tabin
ATTYS.

United States Patent Office 3,677,706
Patented July 18, 1972

3,677,706
REACTOR
Jack Graff, Santa Clara, and Ralph A. Dora, Santa Barbara, Calif., assignors to Packard Instrument Company, Inc., Downers Grove, Ill.
Filed Feb. 24, 1970, Ser. No. 13,663
Int. Cl. B01l 3/00; G01n 31/00
U.S. Cl. 23—230 R                                    10 Claims

ABSTRACT OF THE DISCLOSURE

A reactor for carrying out laboratory scale chemical reactions in the liquid phase comprises a vertically elongated vessel of circular cross-section having steep side walls gradually widening from the top and the bottom, and openings at the top and bottom. An exterior heater is used to regulate the liquid temperature. A passageway for supplying fluid to the lower opening has a portion of restricted sides whereby the constant introduction of gas at low pressure to the passageway prevents liquid outflow while the valveless passageway remains physically open to permit the sequential injection of reagents. A similar passageway for the upper opening permits droplets of solvent to be introduced at the conclusion of reaction; these wash the interior surface of the reactor to afford quantitative recovery of the reaction product.

BACKGROUND OF THE INVENTION

This invention relates to vessels for effecting liquid-phase chemical reactions, and more particularly to reactors and reactor systems designed for laboratory-scale quantitative chemical analyses wherein chemical reactions in the liquid phase are performed and from which the reaction products are recovered quantitatively.

In carrying out the chemical analyses of samples on a very small scale, equipment design should facilitate the ultimate in cleanliness and the ability to effect complete transfers of liquids as required. The foregoing is extremely important in performing quantitative analyses. Improved equipment design consistent with these objectives is desired.

It is an object of the present invention to provide an improved laboratory-scale reactor for carrying out chemical reactions in the liquid phase. A further object is to provide a reaction vessel designed to facilitate the mixing of liquids and gas-liquid separation. Another object is to provide a reactor which faliliitates the transfer of liquid samples to and from the reaction vessel with a minimum of valves through which the samples being treated and analyzed must pass. A further object is to provide a reactor system for carrying out chemical analyses on a laboratory scale including a valveless reaction vessel which can be accurately and uniformly heated and wherein a liquid-phase reaction can be effected and the reactant then can be completely removed for ultimate analysis.

BRIEF DESCRIPTION OF THE DRAWINGS

These and other objects of the invention will be apparent from the following detailed description of a system embodying various features of the invention when read in conjunction with the accompanying drawings wherein:
FIG. 1 is a diagrammatic view of a reactor system for carrying out laboratory-scale chemical reactions which system embodies various features of the invention;
FIG. 2 is an enlarged view taken as a vertical section through the reaction vessel shown in FIG. 1; and
FIG. 3 is a sectional view taken generally along line 3—3 of FIG. 2.

SUMMARY OF THE INVENTION

Briefly, an essentially valveless reaction vessel is provided wherein liquid-phase chemical reactions are effectively performed. The design facilitates the transfer of a sample being analyzed to and from the reaction vessel and the transfer of liquid reagents employed, via inert carrier gas streams. The reaction vessel is vertically oriented with steep side walls gradually widening from the top and bottom and includes restricted openings at the top and bottom thereof. Gravity and the size of the upper opening effect a liquid-gas separation within the reaction vessel. By the maintenance of a constant low pressure flow of carrier gas through the lower opening into the vessel, the liquid reactants are transferred to, and maintained therein without the requirement of ancillary valves.

Reagents may be supplied to the vessel in the desired sequence to carry out the intended chemical reactions. Heat is uniformly supplied to the liquid reactants inward through the walls of the vessel. When the reaction is complete, pressurization of the vessel through the upper opening is employed to transfer the liquid contents out the lower restricted opening. The vessel design facilitates the washing of its total interior surface with a suitable solvent to assure complete transfer of the reaction product is accomplished and to ready the reaction vessel for the treatment of another sample.

DETAILED DESCRIPTION OF THE INVENTION

Very generally, a reaction system 10 is illustrated which includes a reactor 11 that is designed to carry out a laboratory-scale treatment of a small sample of organic material as a part of an analysis of the content of that sample.

(A) Reactor

The reactor 11 includes a vertically disposed reaction vessel 13 that is supported coaxially within a surrounding tube 15. The reaction vessel 13 is circular in horizontal cross section and has a lower opening 17 at the bottom thereof and an upper opening 19 at its apex. A lower, curved conduit 21 passes through the sidewall of the tube 15 and connects to the lower opening 17. A generally similar upper, curved conduit 23 passes through the sidewall of the tube 15 and connects to the top opening 19. These conduits 21, 23 respectively provide passageways 25, 27 from the exterior of the tube to the interior of the reaction vessel 13.

The reaction vessel 13 and its associated conduits 21, 23 are made of a suitable material which is unaffected by the chemical reactants which will be contained therewithin and which is also stable at the temperatures that will be reached during the chemical reactions. The illustrated reaction vessel 13 is made from heat-resistant glass, such as Pyrex, which can be conveniently blown to shape. Because the heating is carried out through the wall of the vessel 13 and because it is important to obtain a fairly quick response time to the heating and cooling, the vessel 13 should be made of a material having at least about the heat conductivity of Pyrex glass. The curved upper and lower conduits 21, 23 are similarly formed from Pyrex glass and assembled into a composite unit by methods well known in the glass-making art.

(B) Gas flow

The dimensions of the lower passageway 25 in the conduit 21 at the bottom of the reaction vessel are critical to achieve the desired valveless operation of the reactor which is considered to contribute to the accuracy and consistency with which the reactor system operates in performing quantitative chemical analyses. The lower passageway 25 should have a portion which is not greater than about 2 millimiters in size and which preferably is substantially circular having a diameter of about 1 millimeter. The portion of the passageway 25 having this restricted size should be at least about 2 millimeters in length and is preferably about 3–4 milliliters long. This lower passageway 25 serves the entrance of the sample which is to undergo the desired chemical reactions and for the various chemical reagents into the vessel 13. It has been found that, by the use of the passageway 25 having such a portion of restricted size, liquids can be maintained in the reactor without the employment of valves.

A slow flow of low pressure inert gas is maintained through the passageway 25 and upward through the liquid in the vessel. The slow flow of gas bubbling through the liquid in the reaction vessel 13 serves to stir the liquid and assure that the chemical reaction proceeds uniformly throughout. Moreover, the prevention of temperature gradients within the vessel is achieved. The inert gas which is injected through the lower passageway 25, exits from the vessel via the upper passageway 27. Generally, the flow of gas is so slow that there is substantially no liquid entrained therein; and moreover, the small size of the upper opening 19 facilitates deposition onto the walls of the vessel 13 of any liquid which might be present in the exit gas stream.

(C) Washing and collection of reaction products

It is very important to assure that the reaction vessel 13 is completely washed by solvent which is supplied through the upper passageway 27 after the chemical reaction is complete and the treated sample is being removed from the vessel. Total washing is necessary to assure complete recovery of the reacted sample upon which the quantitative analysis is being performed. Thus, it has been found to be important that the entrance provided by the upper opening 19 be at the apex of the vessel 13 and be such that the droplets of a liquid solvent being supplied therethrough should break as they pass into the vessel and spread 360 degrees so that a film of solvent travels down the entire interior surface of the wall of the vessel 13. It is found that this desired effect is achieved if the upper opening 19 is not greater than about 2 millimeters and is preferably circular having a diameter between 1 and 2 millimeters. Furthermore, the radius of curvature from the upper passageway 27 to the interior surface of the vessel 13 at the entrance formed by the upper opening 19 should not be greater than about 6 millimeters.

To assure that the interior surface of the sidewall of the vessel 13 is completely washed by the solvent once the breaking of the solvent droplets at the entrance has initially directed the solvent film 360 degrees thereabout, the vessel should be of substantially circular horizontal cross section throughout, and the sidewall should be fairly vertically steep throughout its height. In this respect, the major diameter or width of the reaction vessel 13 should be less than the height of the vessel, and preferably less than one-half the height of the vessel, to assure the desired steepness is achieved. Usually, the vessel will not have an inner diameter greater than about 25 mm. Furthermore, the curvature in the vertical plane of the interior surface of the vessel in expanding from the openings 17, 19 at the top and bottom thereof to the maximum diameter should be as gradual as possible to assure that the solvent film flows relatively uniformly downward along the interior surface of the vessel sidewall. In this respect, the illustrated reaction vessel 13 is generally symmetrical about its vertical center with greatest diameter being at the vertical center. However, although desirable, symmetry is not essential to achieve the gradual curvature desired. In this respect, it is preferred that the curvature of the interior surface of the vessel 13 is such that a line tangent to it at any point forms an angle with the horizontal of at least about 60°.

(D) Temperature control

In the overall reactor system 10, the tube 15 containing the coaxially located reaction vessel 13 is supported vertically above a suitable heater unit 29 which supplies a flow of temperature-controlled air past the exterior surface of the reaction vessel. Because the reaction vessel 13 is located coaxially within the surrounding tube 15, the flow of air through the generally annular region assures good heat transfer at the outer surface of the vessel which proves uniform heating of the liquid phase within the reaction vessel. The stirring action created by the bubbling gas flow further promotes uniformity. To assure the desired heat transfer is obtained, the gap between the outer surface of the vessel at its point of greatest diameter and the inner surface of the tube 15 should not be greater than about 6 millimeters.

The heater unit 29 includes a small blower 31 which is driven by a suitable electric motor (not shown) and a heating element 33. The blower 31 creates a flow of ambient air upward past the heating element 33 which is disposed between the blower and the lower end of the tube 15. The heating is controlled through an automatically timed controller 35 which selectively operates the heating element 33 in accordance with the sequence of chemical reactions taking place in the reaction vessel. A temperature sensor 37 is included between the heating element 33 and the reaction vessel to measure the temperature of the heated air flowing toward the reaction vessel 13. Feedback from the sensor 37 to the controller 35 allows the power supplied to the heating element 33 to be varied, thus providing thermostatic control of the heating element 33.

This method of heating the liquid in the reaction vessel 13 has been found to provide excellent temperature control of the liquid without the employment for any internal temperature-measuring devices which would be in contact with the liquid and thereby provide a potential source of contamination. The absence of internal probes becomes particularly important where quantitative analyses is being performed. It has also been found that the employment of a heated stream of air provides excellent heat transfer through the sidewall of the vessel 13 inward to the liquid which provides relatively quick response whenever it is desired to change temperature conditions within the vessel. The uniformity of temperature achieved within the liquid as a result of the uniform temperature of the vessel sidewall and the stirring action created by the bubbling of inert gas has also been found to be excellent. Furthermore, the ability to relatively quickly lower the temperature of the liquid in the reaction vessel 13 by merely de-energizing the electrical heating element 33 while maintaining blower operation is another advantage of this system.

Overall, it is considered that there are significant advantages to a system for carrying out quantitative analyses wherein temperature control of the reaction vessel is performed by temperature measurement at a location exterior of the liquid undergoing the reaction. Actual experimentation has found that there is excellent correlation, on a time-temperature basis, between the temperature of the air stream flowing about the exterior of the reaction vessel 13 and the temperaure of the liquid disposed therein. This correlation permits programmed operation of the heater unit 29 to achieve the desired functions on an automatic basis.

Although other heating means besides the electrical resistance heating element 33 depicted might be employed, the simplicity of the resistance heater makes it preferable. From this standpoint, the electrical power supplied to the heating element can be simply regulated by the controller 35 so as to raise or lower the temperature of the air stream reaching the reaction vessel as required to achieve the precise temperature control desired. Such temperature control helps to assure obtaining reproducible results from repeated quantitative analyses which the reactor system 10 is being used to perform.

(E) Exemplary use of reactor

The operation of the reactor system 10 may be better understood in connection with an illustrative process wherein it is particularly adapted to be utilized. In this respect, reference is made to copending patent application Ser. No. 750,235, filed Aug. 5, 1968, in the names of Milton Winitz and Jack Graff, entitled "Amino Acid Analysis" and to Anal. Chem. 34 414 (1962). This copending application describes a process for analyzing a biological sample to quantitatively determine the amounts of individual amino acids therein. The illustrated reactor system 10 is utilized in treatment of the biological sample in accordance with the teaching of this copending application to treat the amino acids in the sample to change them to compounds which are sufficiently volatile to permit direct chromatographic analysis. The change of the amino acids to this volatile form takes place in the reaction vessel 13 via a series of chemical reactions.

To introduce the biological sample into the system, a sample holder 41 is provided into which the biological sample is manually injected after an initial pretreatment with ion exchange resins to separate the amino acids from remainder of the sample. A slow constant flow of dry inert gas, for example nitrogen, is then fed through a line 43 to the sample holder 41 from a suitable source and employed to carry the sample, dissolved in a suitable liquid, such as acidified n-propanol, through a line 45 leading to the lower pasageway 25 to the reaction vessel. The carrier gas moves the dissolved sample to the reaction vesel 13, and then additional solvent, supplied through a line 47, is employed to wash the sample holder 41. This solvent is likewise transferred to the reaction vessel 13, and the wash may be repeated. Within the reaction vessel 13, a liquid-gas separation takes place, with the gas exiting from the reaction vessel via the upper opening 19 and the upper passageway 27 which connects to a line 49. The line 49 leads to a valve 51 which in this sequence is connected to a waste container 53 that is vented to the atmosphere.

After the sample has been transferred to the reaction vessel 13, different reagents are supplied sequentially to carry out the chemical process described in the copending application. These reagents are supplied from pressurized bottles 55 which are connected by individual valves 57 to a line 58 leading to the line 45 which connects to the lower conduit 21. Whenever one of the individual valves 57 is open, reagent will flow from the pressurized supply bottle 55 into the reaction vessel 13 because the only connected region of low pressure is through the vented waste container 53.

(1) Reaction.—For example, the amino acids may be initially esterified by treating with anhydrous n-propanol-HCl in the reaction vessel 13. During the esterification process, the temperature of the liquid in the vessel is maintained at about 80° C. for a time sufficient to assure complete esterification has occurred. After the completion of esterification, an azeotroping agent is supplied to the reaction vessel, and the temperature is then raised to about 100° C. in order to distill the volatile contents of the reaction vessel to waste through the upper passageway 27 and the line 49. At the end of this time, the temperature is lowered, and subsequent chemical reactions take place.

(2) Washing of reaction product.—After all the chemical reactions are complete, the valve 51 in the line 49 is operated to disconnect the waste container 53 and to connect source of dry inert gas plus a source 59 of a suitable pressurized solvent, such as ethyl acetate, to the line 49. At the same time, a valve 61 in the line 58 connected to the line 45 leading from the lower conduit 21 is operated to connect the lower passageway 25 from the vessel 13 to a vented sample collector 63.

Thereafter, ethyl acetate is fed into the reaction vessel 13 at a relatively slow rate, and the individual solvent droplets emerging from the upper passageway 27 break at the entrance provided by the upper opening 19 and follow the contour of the inner surface of the vessel sidewall. This distribution provides a very effective washing of the total interior surface of the reaction vessel 13 and assures dissolution of the entirety of the amino acid compounds contained therewithin. The excellent washing action provided by the design of the illustrated reaction vessel 13 permits a quantitative recovery of the amino acid compounds therein. The dissolved compounds are transferred in the solvent out of the vessel through the lower passageway 25 and into the line 45 leading to the vented collector 63. Maintenance of inert gas pressure at the line 47 assures that the flow path of the dissolved sample is toward the collector 63.

(F) Summary

Although the invention has been illustrated with respect to a particular system for quantitative amino acid analysis, it should be understood that the design of the system makes it suitable for the liquid-phase laboratory-scale chemical reactions in general. The valveless design makes the reaction vessel 13 excellently suited for use in quantitative analyses, particularly those wherein temperature control is an important part. Various modifications as would be apparent to one skilled in the art may be made to illustrated design without departing from the scope of the invention which is defined in the appended claims.

Various of the features of the invention are set forth in the following claims.

What is claimed is:

1. A method of effecting a chemical reaction and thereafter quantitatively recovering the reaction product which comprises sequentially introducing a sample and at least one reagent in a constantly flowing carrier gas stream into a lower opening of a vertically elongated vessel having upper and lower openings with restriced passageways therein and steep side walls gradually widening from the bottom to the top and from the bottom and at the conclusion of reaction introducing droplets of solvent into said reactor in a constantly flowing carrier gas stream effecting a washing of the interior surface of the reactor and quantitative removal of the reaction product from said reactor.

2. In a laboratory scale reactor for effecting a liquid-phase chemical reaction, including a vertically elongated vessel, means defining an upper opening at the top of said vessel, means defining a lower opening at the bottom thereof, passageway means for supplying fluid to each of said openings, the improvement comprising, a source of carrier gas, a sample source, a reagent source and a collector coupled to respective ones of said passageway means, means disposed in the passageway means to said lower opening for sequentially introducing a sample and at least one reagent from said respective ones of the sources in a constantly flowing carrier gas stream from said source of gas to said lower opening and, said passageway means to the lower opening at the conclusion of reaction quantitatively directing said reaction products received from said lower opening to said collector, and said reactor having (a) restricted portions in each of said passageways to permit liquid to enter with said carrier gas flow,
(b) steep side walls gradually widening from the top and from the bottom of said vessel, and
(c) means for introducing droplets of solvent into said vessel in a downwardly-flowing carrier gas stream via said upper opening at the conclusion of reaction.

3. Apparatus for effecting liquid-phase chemical reactions including a reactor vessel the vertical dimension of which exceeds its horizontal width in cross-section and which has inlet and outlet openings at its upper and lower ends, comprising in combination, means disposed adjacent said vessel for controlling the temperature therein, means including a source of low pressure inert gas coupled to said lower opening for applying a constant flow of gas to said vessel, restricted passageway means in said upper vessel opening, restricted passageway means interposed between said lower vessel opening and said source of gas allowing introduction of said lower pressure gas through said passage means and preventing liquid outflow from said vessel and steep side walls gradually widening from the upper end and from the lower end of said vessel.

4. A reactor in accordance with claim 3 wherein the radius of curvature between said means defining said upper opening and the interior surface of said vessel is not greater than about 6 mm., said upper and lower opening restrictive passageway means each being not greater than about 2 mm. in size and wherein said interior surface widens gradually to the maximum diameter of said vessel from both the top and the bottom thereof.

5. A reactor in accordance with claim 4 wherein the maximum diameter of said vessel is not greater than about 25 mm.

6. A reactor in accordance with claim 4 wherein the curvature in the vertical plane of said interior surface of said vessel is such that a line tangent thereto forms an angle with the horizontal of at least about 60°.

7. A reactor in accordance with claim 3 wherein said vessel is generally coaxially located within a vertical tube of circular cross section.

8. A reactor in accordance with claim 7 wherein the annular gap between the exterior surface of said vessel at its point of maximum diameter and the inner surface of said tube is not greater than 6 mm.

9. A reactor in accordance with claim 7 wherein heating means is disposed within said tube, and blower means is located at one end of said tube for creating a circulation of air past said heating means and then past said vessel.

10. A reactor in accordance with claim 9 wherein temperature-sensing means is located within said tube between said heating means and said vessel.

References Cited

UNITED STATES PATENTS

| | | | |
|---|---|---|---|
| 3,497,322 | 2/1970 | Boys | 23—253 R |
| 1,204,368 | 11/1916 | Lowy | 23—259 UX |
| 2,526,400 | 10/1950 | Olsen | 23—259 X |
| 2,647,823 | 8/1953 | Van Wessem et al. | 23—259 |

MORRIS O. WOLK, Primary Examiner

R. M. REESE, Assistant Examiner

U.S. Cl. X.R.

23—230 B, 253 R, 292